P. KRUSE.
MACHINE FOR APPLYING ADHESIVES TO CAN HEADS.
APPLICATION FILED SEPT. 24, 1909.
986,469.
Patented Mar. 14, 1911.
2 SHEETS—SHEET 1.
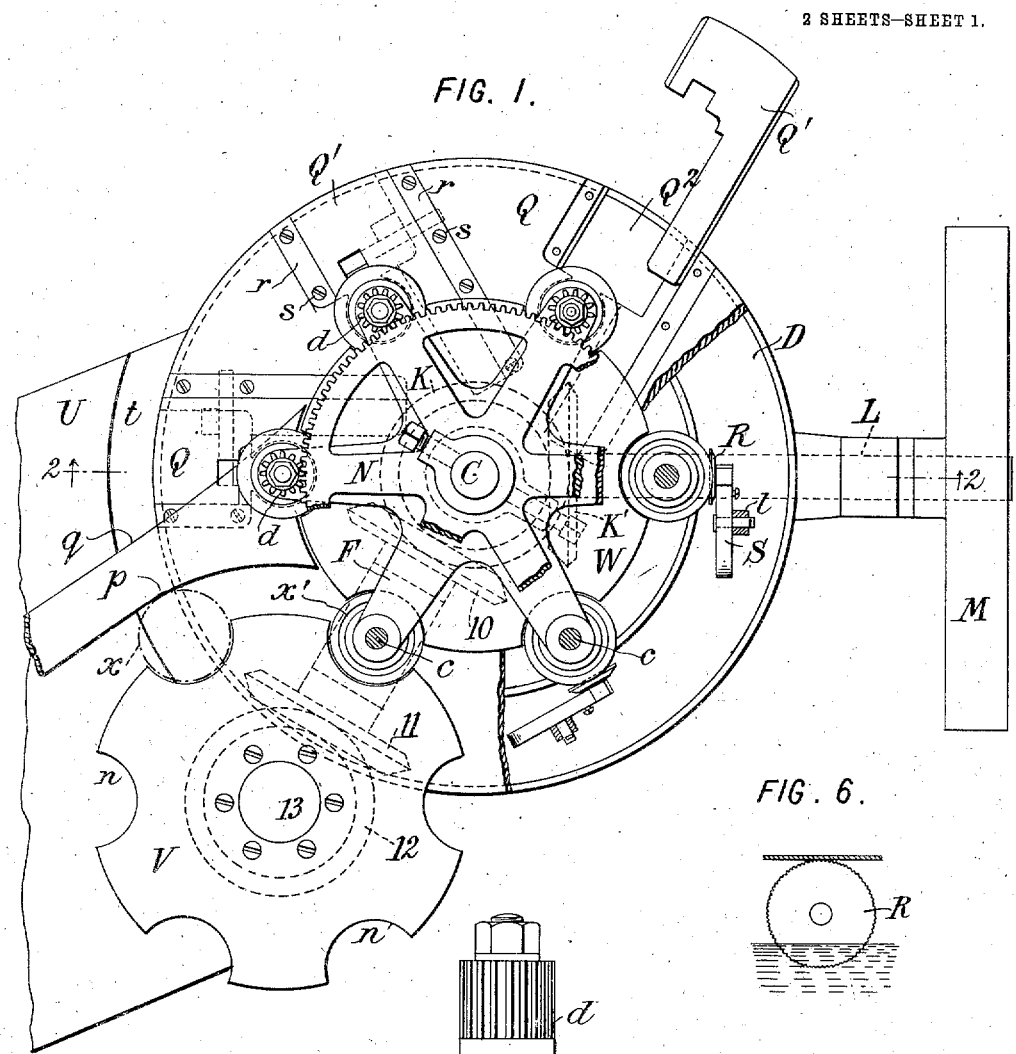
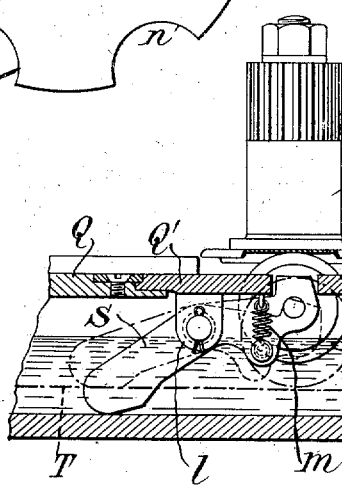
WITNESSES:
Fred White
Rene Bruine
INVENTOR:
Peter Kruse,
By Attorneys, P. KRUSE.
MACHINE FOR APPLYING ADHESIVES TO CAN HEADS.
APPLICATION FILED SEPT. 24, 1909.
986,469.
Patented Mar. 14, 1911.
2 SHEETS—SHEET 2.
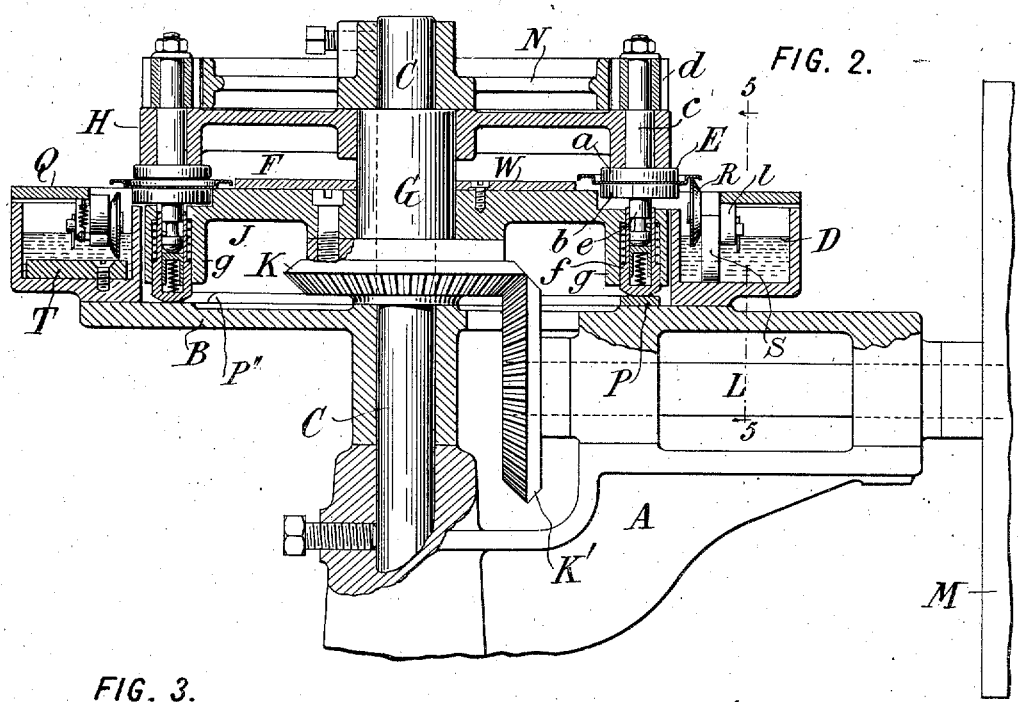
FIG. 2.
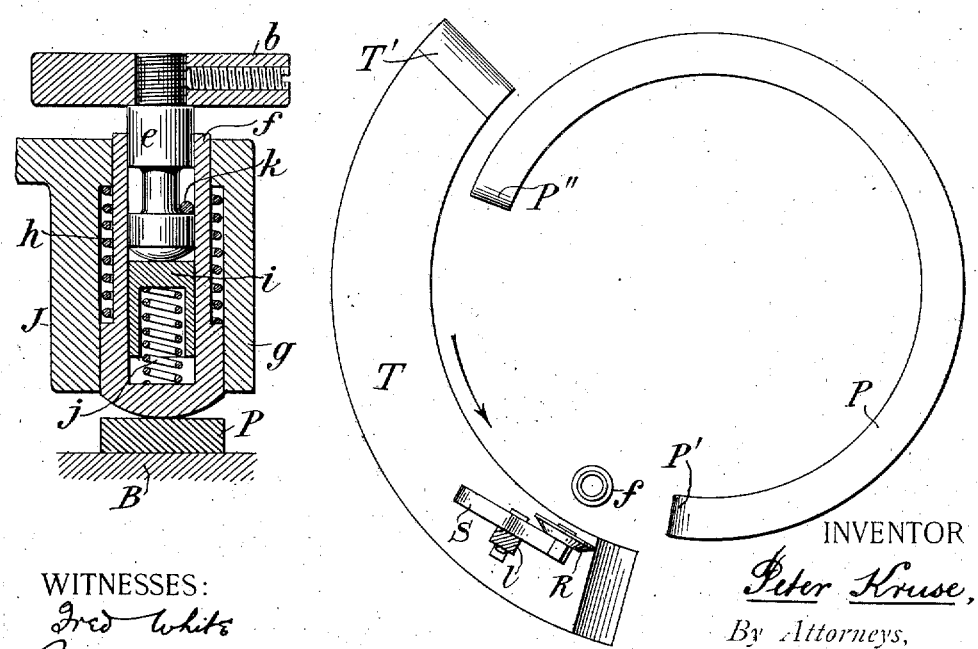
FIG. 3.
FIG. 4.
WITNESSES:
Fred White
René Bruine
INVENTOR:
Peter Kruse,
By Attorneys,
Arthur C. Fraser & Usina

UNITED STATES PATENT OFFICE.

PETER KRUSE, OF NEW YORK, N. Y.

MACHINE FOR APPLYING ADHESIVES TO CAN-HEADS.

986,469.  Specification of Letters Patent.  Patented Mar. 14, 1911.

Application filed September 24, 1909. Serial No. 519,348.

*To all whom it may concern:*

Be it known that I, PETER KRUSE, a citizen of the United States, residing in the borough of Brooklyn, county of Kings, city and State of New York, have invented certain new and useful Improvements in Machines for Applying Adhesives to Can-Heads, of which the following is a specification.

This invention relates to apparatus for applying to can heads, that is to the tops or bottoms of sheet metal cans, a coating of suitable adhesive material such as a rubber cement. Such coating is commonly applied to a can head which is to be united to the can body by seaming and without solder, the coating being sufficiently elastic to form an impervious packing between the folds of the metal forming the seam.

The present machine provides a series of chucks for grasping the can heads which are carried upon a revolving carrier or turn-table, means being provided for revolving the chucks, a cementing roll being provided for each chuck, with automatic means for moving such rollers into contact with the revolving can head. Automatic devices are also provided for feeding the can heads into and out of the machine, in coöperation with means for closing an empty chuck to grasp an entering can head, and for opening a chuck to release a finished can head to permit it to be ejected from the machine.

Figure 1 of the accompanying drawings is a plan of the machine, certain parts being broken away or omitted to show the parts beneath more clearly, and the view being thus partially a horizontal section; Fig. 2 is a vertical section in the plane of the line 2—2 in Fig. 1, this view being upon a larger scale than Fig. 1; Fig. 3 is a section showing part of Fig. 2 on a still larger scale. Fig. 4 is a plan of the operating cams; Fig. 5 is a fragmentary section on the line 5—5 in Fig. 2; Fig. 6 is a fragment of Fig. 5, showing another construction of cementing wheel.

Referring to the drawings, let A designate a supporting frame or standard of any suitable construction adapted to provide bearings for the moving parts. On top of this standard is a table B. Through the middle of this table projects vertically a fixed shaft or stud C which is suitably secured to hold it non-rotative. On the table B is mounted a trough D serving as a receptacle for the adhesive material or cement. This trough is preferably annular, forming a complete circle. Just within and above the trough are located a series of chucks E E for grasping, revolving and carrying the can heads. These chucks are composed of upper and lower pads or disks $a$ and $b$ which receive the can heads between them, suitable means being provided for closing them together to clamp the head and for separating them to release it. Suitable means also is provided for revolving the chucks and for swinging them around in a circular path or orbit. The means shown consists of a turn-table or carrier F comprising a central hub or sleeve G, an upper spider or disk H carrying the upper pads with its central hub fixed on the sleeve G, and a lower spider or disk J having its central hub also fixed on the sleeve G. The turn-table thus formed is revolved continuously through the medium of miter gears K K' from a driving shaft L carrying a driving pulley M or other means for transmitting power. For revolving the chucks a stationary gear N is provided fixedly mounted on the stationary stud or post C, as shown in Fig. 2, and the upper spindles $c$ $c$ of the chucks have keyed upon them pinions $d$ $d$ which mesh with the teeth of this stationary gear, the arrangement thus provided constituting sun and planet wheels, whereby as the turn-table revolves and causes the chucks to travel around in a circular path, their pinions are revolved by engagement with the teeth of the fixed sun wheel N.

For opening and closing the chucks, a suitable means is provided which will be described.

The upper or rotatively driven pad $a$ of each chuck is carried at an invariable height by the mounting of its spindle in one of the arms of the upper spider H. The lower disk or pad $b$ of each chuck is mounted to revolve idly and is movable up and down. Although the specific construction for accomplinshing this is immaterial, yet the construction shown, which is well adapted to the purpose, will now be described. Each pad or disk $b$ is mounted on a spindle $e$ which turns freely in a sleeve or bushing $f$, which is held movably within a socket in the hub $g$ of the carrier spider J. The sleeve $f$ is movable up and down, being pressed downwardly by a spring $h$ located in a counter bore surrounding the sleeve. The lower portion of the sleeve is of larger diameter and forms a head which projects beneath the hub and is engaged by a cam P. The spindle e projects down only part way through the sleeve and rests upon the top of another sleeve i therein which is pressed upwardly by a spring j. The cam P is formed in the arc of a circle, as shown in Fig. 4, the open space between its ends corresponding to that portion of the travel of the chucks wherein they are open and inactive. The cam P is fastened upon the table B just within the trough D, and underlies the path traversed by the axes of the chucks in their circular travel. At its engaging end it has an incline P' which receives the lower end or head of each sleeve f and lifts it against the pressure of its spring h, thereby lifting the parts carried by this sleeve, including the pad b. The lifting movement is slightly greater than that which would bring this pad into grip with the pad a, in order to thereby compress the spring j, which latter spring is stiff enough to grasp the can head with the requisite force, and yet is adapted to yield so as to compensate for varying thicknesses of heads and for any accidental irregularities. When a chuck reaches the opposite end P'' of the cam P, the sleeve f rides down off the end thereof, which is preferably also inclined, thereby lowering the pad b and opening the chuck. To insure that the expansion of the spring j shall not hold up this pad, or in other words to pull down this pad against the upward stress of the spring j, some stop such as a transverse pin or key k, is provided for limiting the upward movement of the rotative spindle e.

The detailed construction of the chuck thus described may be greatly varied within the principle of this invention.

The lower member or spider J of the turn-table is formed with or carries a disk Q of diameter sufficiently large to extend partly over and preferably to entirely cover the adhesive trough D. The plate Q is preferably formed separately from the spider or disk J. It forms the carrier for the means for applying adhesive to the revolving heads. The applying means shown consist each of a cementing roller or roll R, and a lever S carrying this roll on one arm and having its opposite arm or tail projecting downwardly into engagement with a cam T. The lever S is suitably connected to the carrier, preferably by being fulcrumed to a pendant lug l carried thereby, and formed preferably on a removable cover Q', one of which is provided for each adhesive-applying means. A spring m is provided for pressing up the arm of the lever carrying the roll R and pressing down the tail of the lever into engagement with the cam T. The roll R is located outside of the chuck and in position to be directly beneath the portion of the can head to which the adhesive is to be applied, and when pressed up by the spring moves up through a slot or opening into contact with the can head, as shown in Fig. 5, and on the right in Fig. 2. The cam T is conveniently arranged inside the adhesive trough D, in which case the entire lever S for each of the adhesive applying means is placed within this trough. The cam T is arranged to force the adhesive-applying roll down out of action and consequently corresponds in position with the open portion or space between the ends of the cam P, as shown in Fig. 4.

In operation, a can head is first introduced between the separated pads of a chuck while the latter is moving through the open space of the cam P; upon encountering the end P' the chuck is closed and grasps the can head and immediately begins to revolve it. During this time the applying roll R is drawn down out of the way by the action of the cam T. Immediately after the chucking of the can head the corresponding lever S runs off the end of the cam T, and consequently the roll R is drawn up by the spring m into contact with the revolving can head. The rotation of the can head is communicated frictionally to the roll R, which thus revolves, and since its lower portion dips into the bath of adhesive in the trough D, it carries up a portion of this adhesive and applies it to the can head, the adhesive being thus applied to each head in a circular line, the position of which depends upon the precise adjustment of the roll R relatively to the can head. This operation continues during the travel of the can head around in the orbit traversed by its chuck, until shortly before the chuck is opened the entering end T' of the cam T forces up the tail of the lever S and thereby forces down the roll R out of action, whereupon the chuck sleeve drops off the end P'' of the cam P, and the chuck is opened to release the can head, which is then carried out of the machine.

The present invention further provides an automatic feed for feeding the can heads into the chucks and for removing the finished heads therefrom. A feed table U is provided on which the can heads to be operated on are placed. Directly over this revolves a feed disk V which is geared to turn at a speed corresponding with that of the turn-table F. The disk V has notches n n for receiving the can heads and feeding them. In the construction shown these notches are equal in number to the number of chucks on the turn-table F, and accordingly the disk V is geared to revolve at equal speed with that of the turn-table. This gearing is shown in dotted lines in Fig. 1, where a miter gear 10 takes motion from a gear K and communicates it to a miter gear 11 which in turn communicates it to a miter gear 12 fixed on the upright shaft 13 on which the feed disk V is mounted. A curved guide rail $p$ is provided having a surface concentric with the disk V to hold the can heads in place in the feeding notches. The can heads, (one of which is indicated by the dotted circle $x$) are thus carried successively into coincidence with the successive chucks. To better insure the centering of the can heads, a disk W notched similarly to the disk V is fastened on the turn-table F, as shown, so that as the two disks revolve the can head is caught between two coinciding notches and thereby brought into coincidence with the chuck, as shown at $x'$ in Fig. 1. The cam P is so placed that at this instant the chuck closes upon the can head. For feeding out the finished can heads as they are released, any suitable ejector may be provided. I prefer to utilize for this purpose the opposite edge $q$ of the guide bar $p$, which is arranged at a suitable angle to serve as a switch to push off the can heads. This guide bar is fastened to the table U, and its end projects over the revolving disk or table Q, as shown in Fig. 1.

To get access to the adhesive trough D or to the rolls R or their levers, any one or more of the slides Q′ may be displaced by sliding them radially outward in the ways provided for them in the disk Q. In Fig. 1 a slide is partly removed in the position $Q^2$. When the slides are in place they are fastened securely to the table Q by any suitable clamping means, such as by the provision of metal strips $r$ $r$ forming part of their slideways and having screws $s$ for forcing them down to grip the edges of the slides. The slides Q′ may also be set outwardly or inwardly in order to displace the cementing rolls R to different radial distances from the centers of their respective chucks, and thereby adapt the machine for applying cement to can heads of varying diameters. The table U is spaced apart from the turn-table Q at $t$ sufficiently to allow for any necessary outward adjustment of the slides Q′.

An important feature is the construction of the chucks E E so that they grasp the can heads yieldingly, whereby not only are they caused to adapt themselves to heads of varying thickness, but they may compensate for irregularities in the heads. The tensions of the springs $j$ are such that the can heads are gripped with substantially uniform force, notwithstanding any normal variations in thickness. The machine therefore requires no adjustment for variations in thickness of the heads, even taking into consideration the considerable degree of variation in the annular corrugations or ribs with which can heads are usually provided. By making the pads $a$ $b$ of the chucks small enough to enter within the outer flange of can heads of the minimum size, the same pads will serve for several larger sizes of heads, so that the entire range of can heads may be provided for either by one set of pads of minimum size, or by the provision of two or perhaps three sets, which may on occasion be substituted for one another.

Another important feature is that the cementing rolls are spring-seated, so as to adjust themselves automatically to the flanges of the can heads, and so as to yield readily to any inequalities therein. Can heads are sometimes distorted in the dies of the punching press, or subsequently, so that the flange to which the cement is to be applied is not in a plane exactly parallel to the inner portion of the head. In the event of any such distortion the yieldingly mounted cementing roll will automatically rise and fall as the can head revolves, thus adapting itself to the inequalities of surface, and applying the cement thereto as efficiently as if the head were perfectly true. By causing the cementing rolls to travel in the bath of adhesive material in the annular trough, each roll carries up a liberal quantity of the adhesive and applies it directly and promptly to the flange of the can head with the minimum of loss by evaporation. During the travel of the head while carried in its chuck around nearly the complete circular movement of the latter, the adhesive material is continuously applied and re-applied to its flange, this operation continuing as long as the can head is revolved in contact with the cementing roll. Thus is insured a very thorough application of the adhesive material to the flange of the can head. The progressive movement of the cementing rolls R and their levers S through the trough also has the effect to keep the cement solution or composition therein thoroughly stirred, and hence to maintain it in homogeneous condition. In the case of a vaporizable solution such as a rubber cement, undue evaporation is prevented by the disk Q, which covers over the cement receptacle except at the openings through which the rolls R emerge.

It is advantageous to form the applying rolls R with a knurled or serrated periphery, as shown in Fig. 6. For certain qualities of adhesive material, this greatly facilitates the applying of a suitable quantity of adhesive. The cementing material which is carried up in the notches between the serrations, cannot be squeezed out by forcible contact of the rim of the wheel with the cam head, but is carried into contact with the latter and remains adhering thereto in a band or film of suitable thickness. This effect can only be secured by causing the serrated roll to turn directly in the bath of adhesive.

The machine provided by my invention is adapted to rapidly and effectively apply rubber cement or other adhesive material to the flanges of can heads, being entirely automatic except for the services of an attendant to guide the heads into the notches of the feeding disk V. The machine requires but little supervision, and for changing from one size of head to another it involves the minimum of adjustment. For this change of course the disks V and W require to be replaced by disks having notches of the necessary size to fit the size of can heads to be operated upon.

The machine provided by my invention is subject to considerable modification in matters of detail and construction. Those features which are deemed to be essential to my invention are set forth in the following claims.

Certain parts or features of my invention are applicable generally to machines for grasping or manipulating can heads or analogous parts, and are not necessarily confined in their application to machines for applying adhesive material to can heads.

What I claim is:—

1. The combination of a revolving carrier, a plurality of chucks carried thereby, each comprising opposite pads pressed yieldingly together and adapted to grasp a can-head between them, and to revolve on an axis perpendicular to the plane of the can-head, means for revolving said chucks, means for opening and closing the chucks, and means coöperating therewith for applying adhesive material to can heads held by said chucks, comprising a cementing roll adjacent to each chuck.

2. The combination of a revolving carrier, a plurality of chucks carried thereby, means for revolving said chucks, means for opening and closing the chucks, and means for applying adhesive to can heads held by said chucks comprising a cementing roll adjacent to each chuck, and means for moving said roll into and out of contact with the can head.

3. The combination of a revolving carrier, a plurality of chucks carried thereby, means for revolving said chucks, means for opening and closing the chucks, an annular trough for containing adhesive material, cementing rolls held in said trough by the carrier, and means for moving said rolls into and out of contact with can heads carried by said chucks.

4. The combination of a revolving carrier, a plurality of chucks carried thereby, means for revolving said chucks, means for opening and closing the chucks, an annular trough for containing adhesive material, cementing rolls carried in said trough by the carrier, levers on which said rolls are mounted, and a cam acting on said levers for moving said rolls into and out of contact with can heads held by said chucks.

5. The combination of a stationary vessel for containing adhesive material, a revolving carrier, and adhesive applying means mounted on said carrier and comprising cementing rolls traveling in the bath of adhesive in said vessel.

6. The combination of an annular trough for containing adhesive material, a revolving carrier, and adhesive applying means mounted on said carrier and comprising cementing rolls traveling in the bath of adhesive in said trough.

7. The combination of an annular stationary trough for containing adhesive material, a revolving carrier having chucks for holding the can heads, and adhesive applying means comprising levers mounted on said carrier, and cementing rolls carried by said levers so as to travel in the bath of adhesive in said trough and means for moving said levers to bring said rolls into and out of contact with can-heads held by said chucks.

8. The combination of a stationary trough for containing adhesive material, a revolving carrier comprising a plate for covering said trough, and adhesive applying means carried by said carrier and comprising cementing rolls traveling in the bath of adhesive and movable through openings in said cover.

9. The combination with a revolving chuck for holding a can head, of a cementing roll, a spring acting to press said roll against the can head whereby to yieldingly engage the latter and apply cement thereto, and a cam adapted to retract said roll against the stress of said spring.

10. The combination with a revolving chuck for holding a can head, of a cementing roll, a lever carrying said roll, a spring for pressing said roll upwardly into yielding engagement with the can head, and a cam acting upon said lever for forcing the roll downward out of engagement against the stress of said spring.

11. The combination of a revolving carrier, a plurality of chucks carried thereby, means for revolving said chucks, cementing rolls carried by said carrier, springs for pressing said rolls up into contact with can heads carried by said chucks, and a cam for forcing said rolls down out of contact therewith against the stress of said springs.

12. The combination of a revolving carrier, a plurality of chucks carried thereby, means for revolving said chucks, a vessel for containing adhesive material, cementing rolls carried by the carrier, levers on which said rolls are mounted, springs acting on said levers to press said rolls into contact with can heads carried by said chucks, and an annular cam acting on said levers for forcing said rolls out of contact with the can heads.

13. The combination of a revolving carrier, a plurality of chucks carried thereby, means for revolving said chucks, an annular cam for opening and closing the chucks, cementing rolls carried by the carrier, springs for pressing said rolls up into contact with can heads carried by said chucks, and an annular cam for forcing said rolls down out of action against the stress of their springs.

14. The combination of a revolving carrier, a plurality of chucks carried thereby, radially adjustable parts carried by said carrier, and cementing rolls carried by said adjustable parts, whereby the rolls may be set to varying distances from the centers of their respective chucks to adapt them for can heads of varying sizes.

15. The combination of a revolving carrier, a plurality of chucks carried thereby, radially adjustable slides carried by said carrier, and cementing rolls carried by said adjustable slides, whereby the rolls may be set to varying distances from the centers of their respective chucks to adapt them for can heads of varying sizes.

16. The combination of a circular vessel for containing adhesive, a revolving carrier, a disk carried thereby covering said vessel, radial slides carried by said disk, and cementing rolls carried by said slides, whereby said rolls may be adjusted to varying distances from the center.

17. The combination of a revolving chuck comprising opposite pads pressed yieldingly together and adapted to grasp a can head elastically between them, a cementing roll and a spring for pressing said roll yieldingly against a can head held by such chuck and cams for opening and closing said chuck and for retracting said roll.

18. The combination with a revolving chuck adapted to grasp a can head, of a cementing roll having its peripheral applying surface serrated, and a receptacle containing adhesive material in which said roll turns whereby its indentations are filled with adhesive which is carried to the can-head and applied thereto by adhesion.

19. A revolving chuck for carrying a can head comprising a revoluble upper pad, a revoluble and vertically movable lower pad, a spring for pressing the lower pad down to open the chuck, means for pressing said pad upward to close the chuck, and a spring interposed between such means and the pad to cause it to grasp the can head yieldingly combined with adhesive applying means adapted to press yieldingly against a can-head held in such chuck.

20. A revolving chuck for carrying a can head comprising a revoluble upper pad, a revoluble and vertically movable lower pad, a sleeve carrying said lower pad, a spring for pressing down the sleeve and lower pad to open the chuck, means for pressing said sleeve upwardly to close the chuck, and a spring between said sleeve and pad adapted to yield when the pad engages the can head combined with adhesive applying means adapted to press yieldingly against a can-head held in such chuck.

21. A revolving chuck for carrying a can head comprising a revoluble upper pad, a revoluble and vertically movable lower pad, a sleeve carrying said lower pad, a spring for pressing down the sleeve and lower pad to open the chuck, means for pressing said sleeve upwardly to close the chuck, said pad having a stud movable vertically in said sleeve, a stop to limit its upward movement whereby to draw the pad down, and a spring between said sleeve and pad adapted to yield when the pad engages the can head combined with adhesive applying means adapted to press yieldingly against a can-head held in such chuck.

22. The combination of a revolving carrier, comprising a horizontal disk, a plurality of chucks carried thereby, adapted to receive can-heads, means for opening and closing the chucks and means for feeding can heads to said chucks comprising a table and a pair of revolving disks of a thickness approximating that of the can-heads, and having notches to receive the can heads, one of said disks mounted on said carrier with its notches in coincidence with the chucks, and the other revolving adjacent thereto over the surface of said table to bring its notches into coincidence with those of the carrier disk and thereby center the head with reference to the respective chucks.

23. The combination of a revolving carrier comprising a horizontal disk provided with can-head receiving notches, a plurality of chucks carried by said carrier on vertical axes, comprising pairs of pads adapted to carry can-heads in the plane of said disk, means for opening and closing the chucks, means for automatically feeding can-heads to said chucks and for centering them, comprising a table and a revolving disk of a thickness approximating that of the can-heads, and having notches to receive the can heads, one of said disks mounted on said carrier with its notches in coincidence with the chucks, and the other revolving adjacent thereto over the surface of said table to bring its notches into coincidence with those of the carrier disk and thereby center the head with reference to the respective chucks, and means for feeding can-heads out from said chucks comprising an ejector plate projecting over the path of said chucks and adapted to enter the space between the pads of the opened chucks and engage the can-heads which have been released by the opening of the chucks and guide them out beyond said carrier.

24. The combination of a revolving carrier, a stationary vessel below said carrier for containing adhesive material, and a cementing roll revolving in said bath of adhesive material and adapted to apply said adhesive material to a can head or similar object carried over said roll.

25. The combination of a revolving carrier, a stationary vessel below said carrier for containing adhesive material, cementing rolls carried by said carrier and traveling in the bath of adhesive material, levers on which said rolls are mounted which enter the said bath and are adapted to stir the said adhesive material as they travel.

In witness whereof, I have hereunto signed my name in the presence of two subscribing witnesses.

PETER KRUSE.

Witnesses:
FRED. H. MCGAHIE,
CHARLES EDWIN POLLARD.